(12) United States Patent
Wilson et al.

(10) Patent No.: US 12,082,533 B2
(45) Date of Patent: Sep. 10, 2024

(54) WRAP MATERIAL GUIDE PAN FOR ROUND BALER

(71) Applicant: Vermeer Manufacturing Company, Pella, IA (US)

(72) Inventors: Blake Wilson, Altoona, IA (US); Darrell Buchanan, Oskaloosa, IA (US); Michael Lenger, Bussey, IA (US); Spencer Fynaardt, Pella, IA (US); Ben Helland, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 3 days.

(21) Appl. No.: 18/182,243

(22) Filed: Mar. 10, 2023

(65) Prior Publication Data

US 2023/0284565 A1    Sep. 14, 2023

Related U.S. Application Data

(60) Provisional application No. 63/318,704, filed on Mar. 10, 2022.

(51) Int. Cl.
  *A01F 15/18* (2006.01)
  *A01F 15/07* (2006.01)

(52) U.S. Cl.
  CPC .......... *A01F 15/0715* (2013.01); *A01F 15/18* (2013.01); *A01F 2015/079* (2013.01); *A01F 2015/186* (2013.01)

(58) Field of Classification Search
  None
  See application file for complete search history.

(56) References Cited

U.S. PATENT DOCUMENTS

| | | | |
|---|---|---|---|
| 4,677,807 A | | 7/1987 | Verhulst et al. |
| 4,697,402 A | | 10/1987 | Anstey et al. |
| 4,969,315 A | * | 11/1990 | Ardueser ............ A01F 15/0715 53/389.5 |
| 5,557,906 A | * | 9/1996 | Viaud ................. A01F 15/0715 53/118 |
| 7,513,088 B2 | | 4/2009 | Vande Ryse |
| 8,522,512 B2 | | 9/2013 | Paillet et al. |
| 10,609,868 B2 | | 4/2020 | Hummel et al. |
| 10,827,685 B2 | | 11/2020 | Talsma et al. |
| 10,881,049 B2 | | 1/2021 | Gresset et al. |
| 10,912,257 B2 | * | 2/2021 | Jacobson ............. A01D 46/084 |
| 11,032,974 B2 | | 6/2021 | Pilcher et al. |
| 11,039,575 B2 | | 6/2021 | Pilcher et al. |

(Continued)

*Primary Examiner* — Chinyere J Rushing-Tucker
(74) *Attorney, Agent, or Firm* — Armstrong Teasdale LLP

(57) ABSTRACT

Disclosed herein is a wrap material feed system of a round baler for forming crop material into a cylindrical bale. The wrap material feed system comprises a first roller, a second roller, a bale formation belt, and a feed pan oriented from a first end adjacent the first roller to a second end adjacent the second roller and a feed pan positioning mechanism oriented to bias the feed pan into engagement with each of the first and second rollers and the bale formation belt. The feed pan comprises one or more runners, at least one guide plate, one or more skid plates, and one or more fasteners comprising a fastener head. The fastener head is positioned at the second end such that a vector representing a first normal force at the second roller intersects the fastener head.

20 Claims, 18 Drawing Sheets

(56) References Cited

U.S. PATENT DOCUMENTS

| | | |
|---|---|---|
| 2007/0101694 A1 | 5/2007 | Hood et al. |
| 2017/0101694 A1 | 4/2017 | Perlade et al. |
| 2018/0242527 A1* | 8/2018 | Pilcher .................... A01F 15/08 |
| 2018/0303038 A1* | 10/2018 | Pilcher ................... A01F 15/18 |
| 2019/0133043 A1* | 5/2019 | Gresset ............... A01F 15/0715 |
| 2019/0183057 A1* | 6/2019 | Dutertre ................ A01F 15/085 |
| 2021/0029884 A1* | 2/2021 | Kappelman ............. A01F 15/07 |

\* cited by examiner

WRAP MATERIAL GUIDE PAN FOR ROUND BALER

CROSS REFERENCE TO RELATED APPLICATIONS

This application claims the benefit of priority to U.S. Provisional Patent Application No. 63/318,704, filed Mar. 10, 2022, the contents and disclosure of which are incorporated by reference herein in their entirety. Reference is also made to U.S. Patent Application Publication No. 2019/0166769, filed Dec. 4, 2018, and U.S. Patent Application Publication No. 2019/0045717, filed Aug. 6, 2018, and now issued as U.S. patent Ser. No. 10/827,685, which are hereby incorporated by reference in their entirety.

DISCUSSION OF ART

The field of the invention relates generally to balers for harvesting agricultural crops, and more particularly, to round balers.

Round balers are commonly used in agricultural applications to harvest crops and compact them into a form that can be easily transported and stored. Round balers generally operate by gathering a crop (e.g., hay) into a bale formation chamber, rolling the crop into a compressed cylindrical bale using a series of tensioned belts and rollers, and wrapping the completed bale in a wrap material that may be netted or webbed (e.g., netwrap). Applying the wrap material to the completed bale enables it to hold its shape and maintain its quality by shedding water.

Many round balers include a mechanism for feeding the wrap material into the bale formation chamber from a supply roll near the tailgate. Such mechanisms generally include a feed pan positioned under a bottom span of the tensioned belts to carry the wrap material into the bale formation chamber with the motion of the belt. However, when round balers are used to collect silage or other wet crops, crop residue can fall from the bale formation chamber into the feed pan, leaving behind a sticky residue that impedes the movement of the wrap material.

Thus, there is a need for a wrap material feed pan that reduces the buildup of crop residue and the potential for wrap material feeding issues.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION OF THE DISCLOSURE

In one embodiment, a wrap material feed system of a round baler for forming crop material into a cylindrical bale is disclosed. The wrap material feed system includes a first roller, a second roller, a bale formation belt routed around and extending between each of the first roller and the second roller, a feed pan oriented from a first end adjacent the first roller to a second end adjacent the second roller, and a feed pan positioning mechanism oriented to bias the feed pan into engagement with each of the first and second rollers and the bale formation belt. The feed pan includes one or more runners extending from the first end adjacent the first roller to the second end adjacent the second roller, each of the one or more runners including a center section adjacent the bale formation belt that extends between each of the first and second rollers. The feed pan also includes at least one guide plate positioned at the first end of each of the one or more runners and one or more skid plates, each of the one or more skid plates oriented to engage with the center section of one of the one or more runners. The feed pan further includes one or more fasteners including a fastener head, each of the one or more fasteners positioned at the second end of each of the one or more runners and oriented to secure each of the one or more runners to one of the one or more skid plates, wherein the fastener head is positioned at the second end such that a vector representing a first normal force at the second roller intersects the fastener head.

In another embodiment, a wrap material feed system of a round baler for forming crop material into a cylindrical bale is disclosed. The wrap material feed system includes a first roller, a second roller, a bale formation belt routed around and extending between each of the first roller and the second roller, a feed pan oriented from a first end adjacent the first roller to a second end adjacent the second roller, and a feed pan positioning mechanism oriented to bias the feed pan into engagement with each of the first and second rollers and the bale formation belt. The feed pan includes one or more runners extending from the first end adjacent the first roller to the second end adjacent the second roller, each of the one or more runners including a center section adjacent the bale formation belt that extends between each of the first and second rollers. The feed pan also includes at least one guide plate positioned at the first end of each of the one or more runners and one or more skid plates, each of the one or more skid plates oriented to engage with the center section of one of the one or more runners. The feed pan further includes at least one wear component positioned at the second end of the one or more runners, wherein the at least one wear component is positioned at the second end such that a vector representing a first normal force at the second roller intersects the at least one wear component.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION OF THE DISCLOSURE

Figure 1:
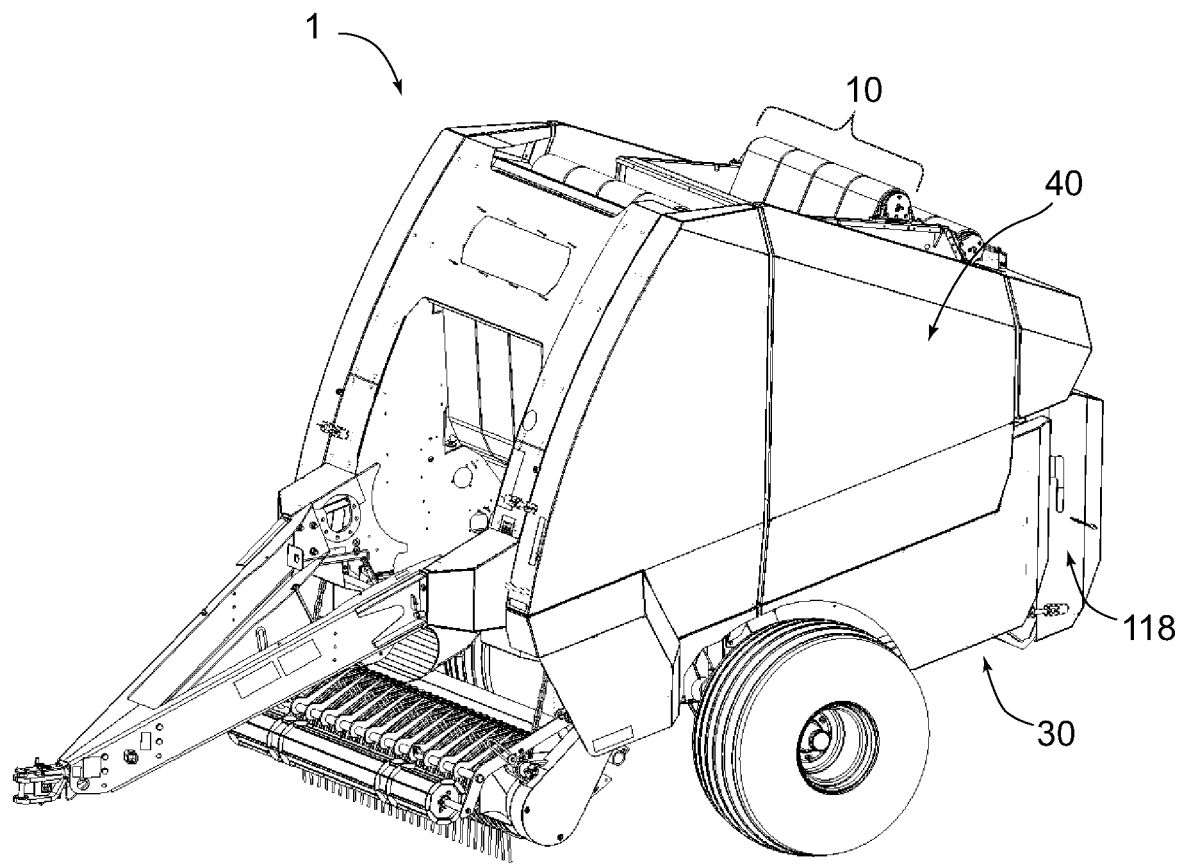
FIG. 1 is a side perspective view of a baler.
Figure 2:
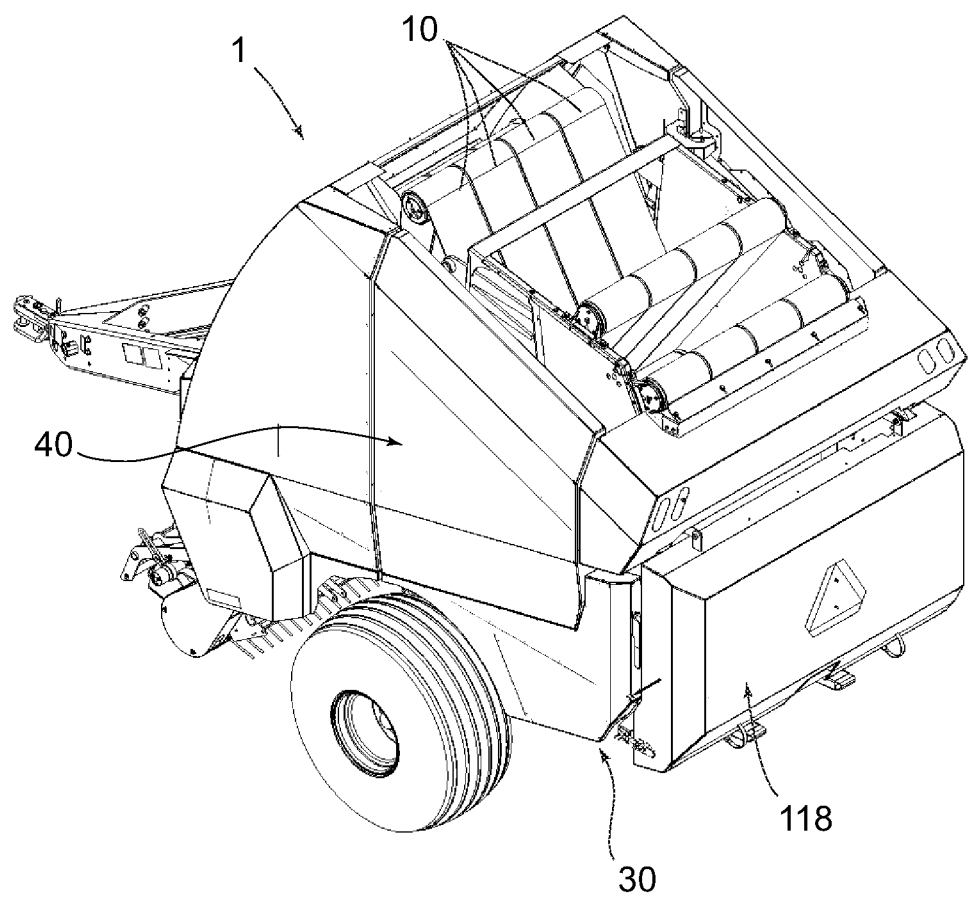
FIG. 2 is another side perspective view of the baler shown in FIG. 1.

FIGS. 1 and 2 are side perspective views of a baler 1. In the example embodiment, the baler 1 is a round baler. The baler 1 includes a baler frame 30, a bale formation chamber 40 that utilizes one or more of a belt 10 to form bales, and a wrapping device 118 to apply one or more of a layer of wrap material to an outer circumference of a formed bale. In some embodiments, one to five layers of the wrap material may be applied. In the example embodiment, the baler 1 includes four belts 10. In other embodiments, the baler 1 may include more or less than four belts 10.

Figure 3:
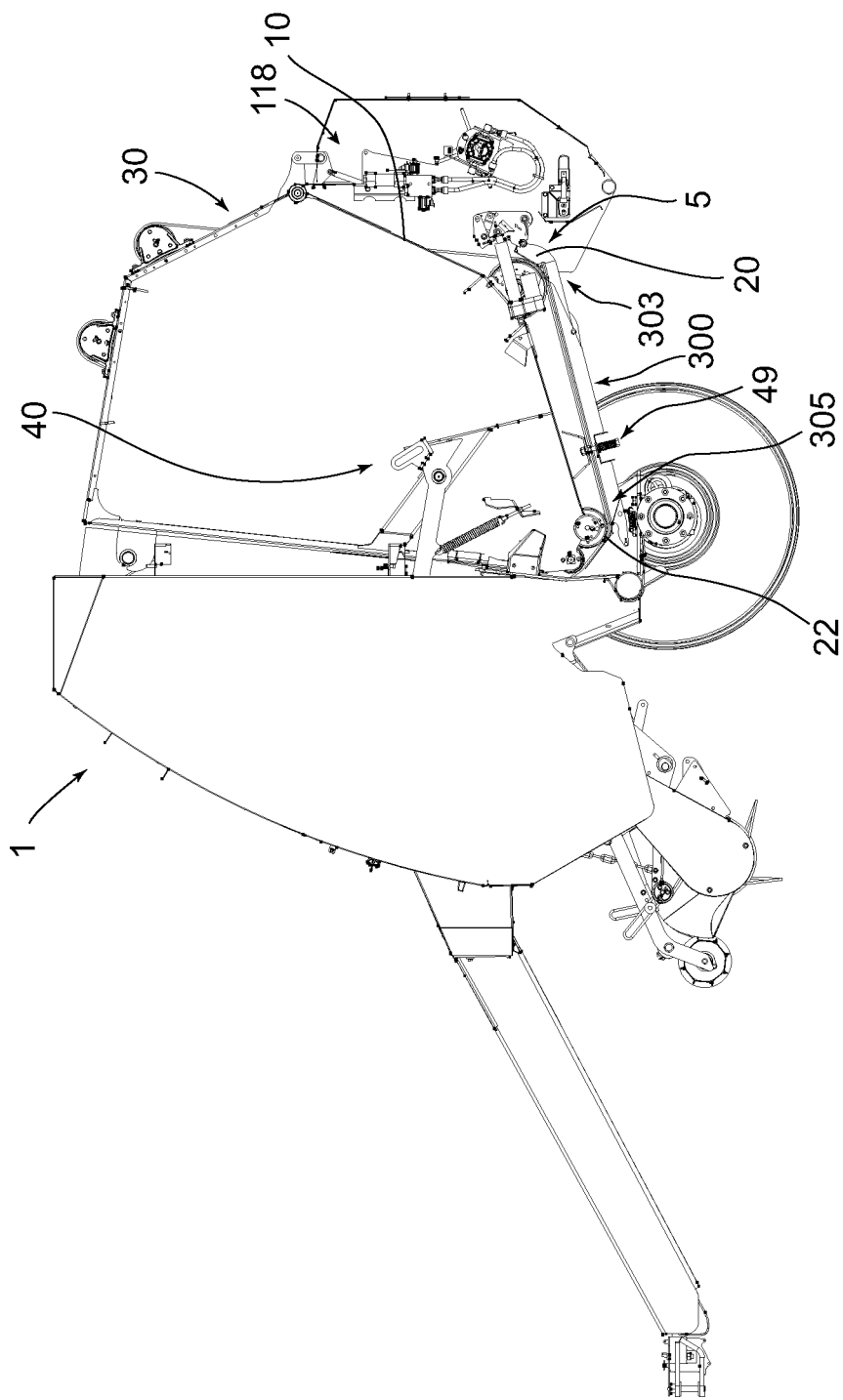
FIG. 3 is a side view of the baler shown in FIG. 1 including a wrap material feed system.

FIG. 3 is a side view of the baler 1 including a wrap material feed system 5. The belt 10 is routed around a series of rollers, including a first roller 20 (shown in FIGS. 4 and 5) rotatably mounted to a first shaft 21 (shown in FIG. 4) to form a bale. In the example embodiment, the belt 10 is flat. The belt 10 is further routed around a second roller 22 (shown in FIG. 5) rotatably mounted to a second shaft (not shown). The first shaft 21 and the second shaft (not shown) are connected to the baler frame 30.

The wrap material feed system 5 includes a feed pan 300 positioned adjacent to the belt 10. The feed pan 300 is oriented from a first end 303 adjacent the first roller 20 (shown in FIGS. 4 and 5) to a second end 305 adjacent the second roller 22 (shown in FIG. 5). Additionally, the wrap material feed system 5 includes a feed pan positioning mechanism 49 for biasing the feed pan 300 into engagement with the belt 10 and each of the first and second rollers 20, 22. In the example embodiment, the feed pan positioning mechanism 49 includes a pair of springs 50 (shown in FIG. 4) connecting the feed pan 300 to the baler frame 30. The feed pan positioning mechanism 49 may additionally include one or more of a washer, a nut, and/or a bolt, such as, but not limited to, a cross-member bolt 311 (shown in FIGS. 20-25).

Figure 4:
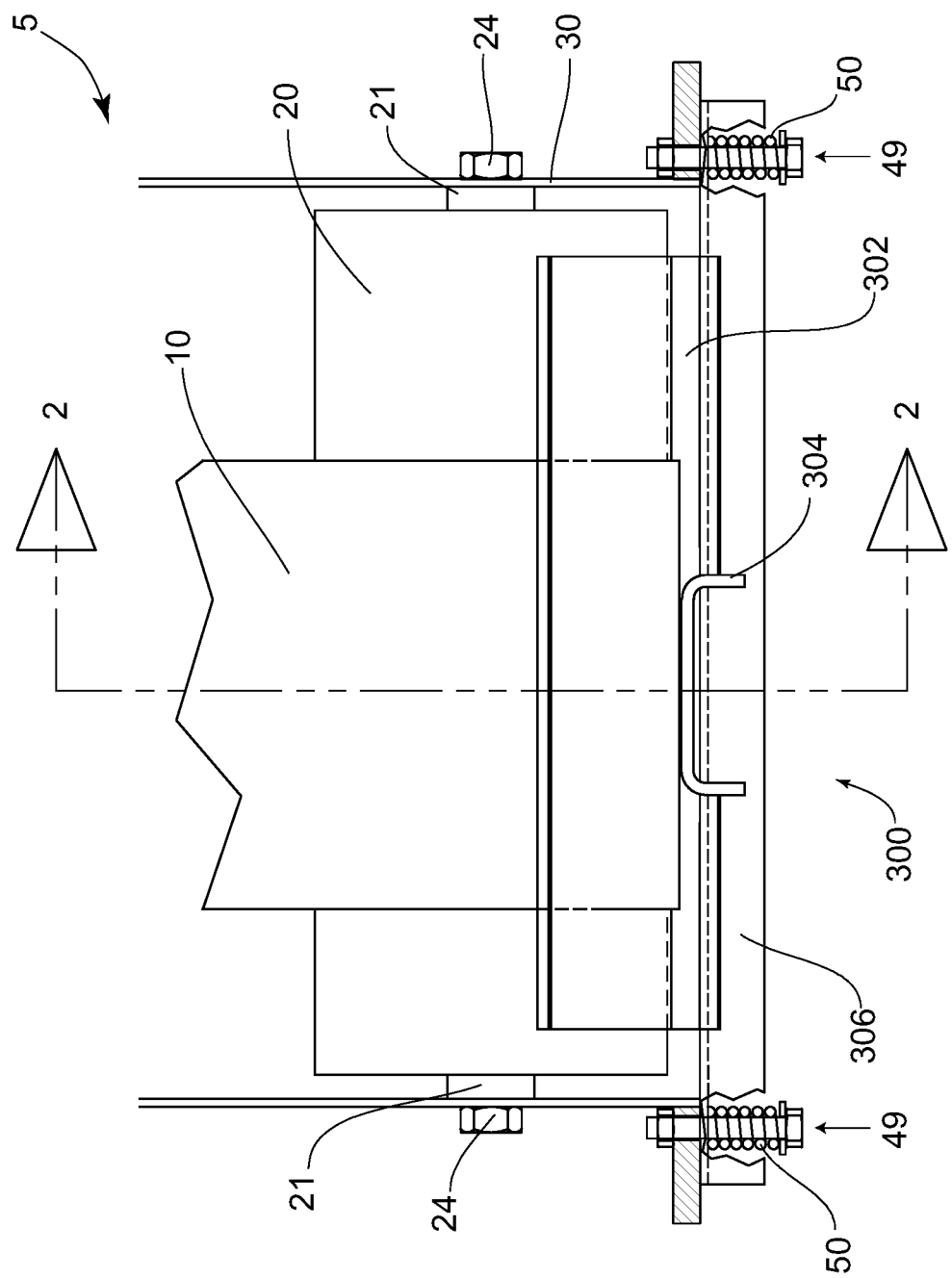
FIG. 4 is a front cross-sectional view of the wrap material feed system shown in FIG. 3.

FIG. 4 is a front cross-sectional view of the wrap material feed system 5. Each end of the first shaft 21 for roller 20 is fastened to the baler frame 30 with one or more bolts 24. Additionally, each end of the second shaft (not shown) for roller 22 is fastened to the baler frame 30 with one or more bolts 24. The feed pan 300 includes one or more of a runner 304 extending from the first end 303 (shown in FIG. 3) adjacent the first roller 20 to the second end 305 (shown in FIG. 3) adjacent the second roller 22 (shown in FIG. 5). The runner 304 is fixed to a guide plate 302 positioned at the first end 303 (shown in FIG. 3) adjacent the first roller 20. Additionally, the runner 304 is fixed to a cross-member 306, with the cross-member 306 being secured to the baler frame 30.

Figure 5:
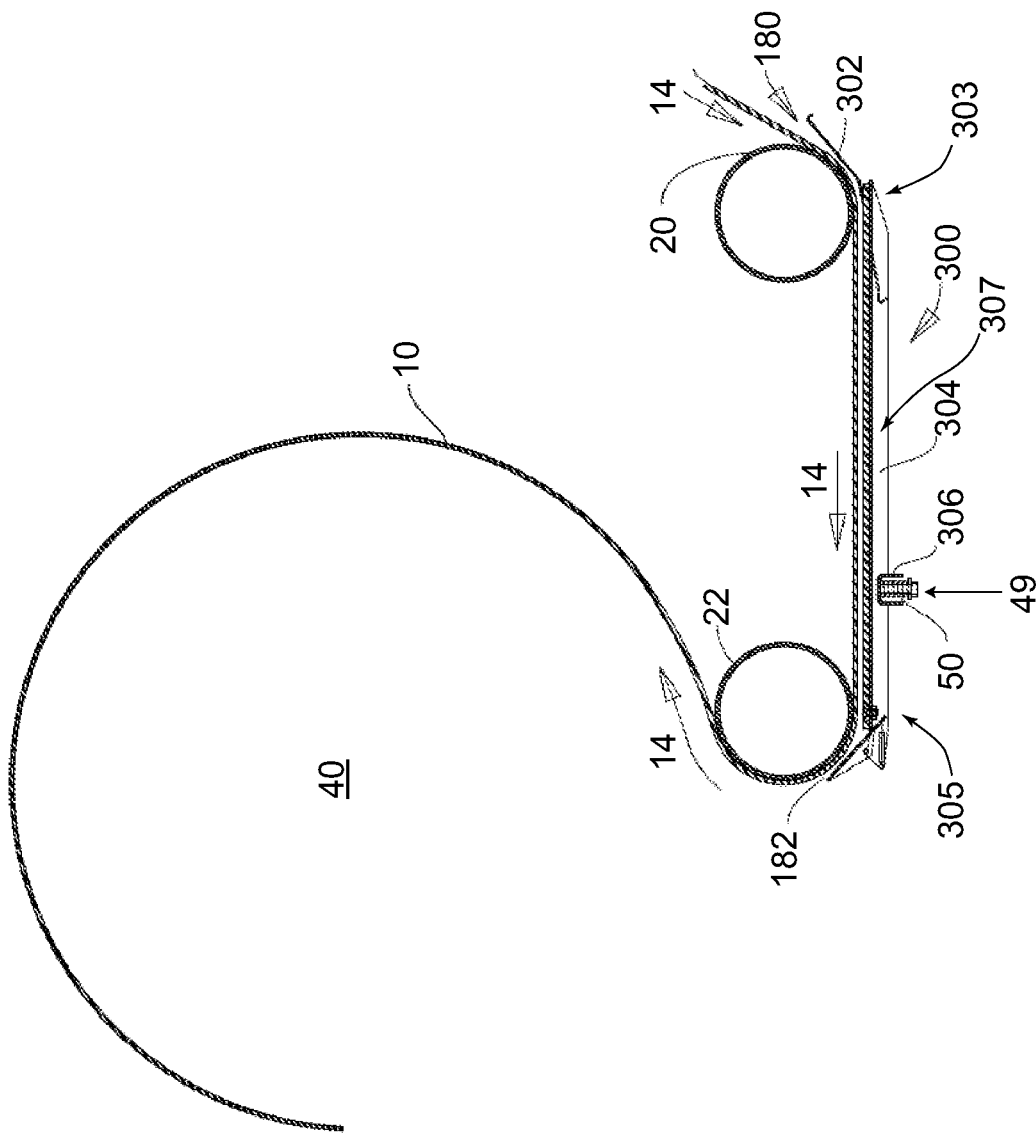
FIG. 5 is a side cross-sectional view of the wrap material feed system shown in FIG. 4, taken along line "2-2".

FIG. 5 is a side cross-sectional view of the wrap material feed system 5, taken along line "2-2" of FIG. 4. The rotational motion of the first and second rollers 20, 22 is translated to linear motion of the belt 10 in a wrap direction 14, drawing the belt 10 into and around the bale formation chamber 40. In the example embodiment, the bale formation chamber 40 has a generally circular shape. The baler may include additional bale formation belts and/or additional mechanical systems configured to propel the belt(s) and maintain tension therein as the bale formation chamber 40 changes in diameter.

In FIG. 5, the feed pan 300 is illustrated spaced slightly apart from the first and second rollers 20, 22 and the belt 10 for clarity: however, this position is not representative of its position in operation. The runner 304 includes a center section 307 that extends from the first roller 20 to the second roller 22 adjacent the belt 10. The feed pan 300 can include any suitable number of runners 304 that allows the wrap material feed system 5 to function as described herein, for example and without limitation, one, two, three, or more. The runner 304 is fixed to the cross-member 306 and the cross-member 306 is attached to the baler frame 30 by at least one of the cross-member bolt 311 (shown in FIGS. 20-25) at a suitable location between the first end 303 and the second end 305 of the runner 304.

The pair of springs 50 of the feed pan positioning mechanism 49 push the feed pan 300 into contact with the baler frame 30, and the one or more of the cross-member bolt 311 aligns an aperture of the cross-member 306 with an aperture of the baler frame 30, thus positioning the feed pan 300. If any type of material or debris, such as crop debris or the wrap material, comes between the belt 10 and the feed pan 300, the pair of springs 50 are compressed, allowing the feed pan 300 to move away from the first roller 20 for the material to pass through the wrap material feed system 5 without damaging any system components.

The feed pan 300 is positioned such that a portion of the guide plate 302, the first roller 20, and the belt 10 form a feed funnel 180. Wrap material, from off of a supply roll (not shown) of wrap material, may be fed therethrough during operation of the wrap material feed system 5. The supply roll and a device for cutting the wrap material (not shown) may be located adjacent the first end 303 of the feed pan 300 within (or "part of") the wrapping device 118.

Figure 6:
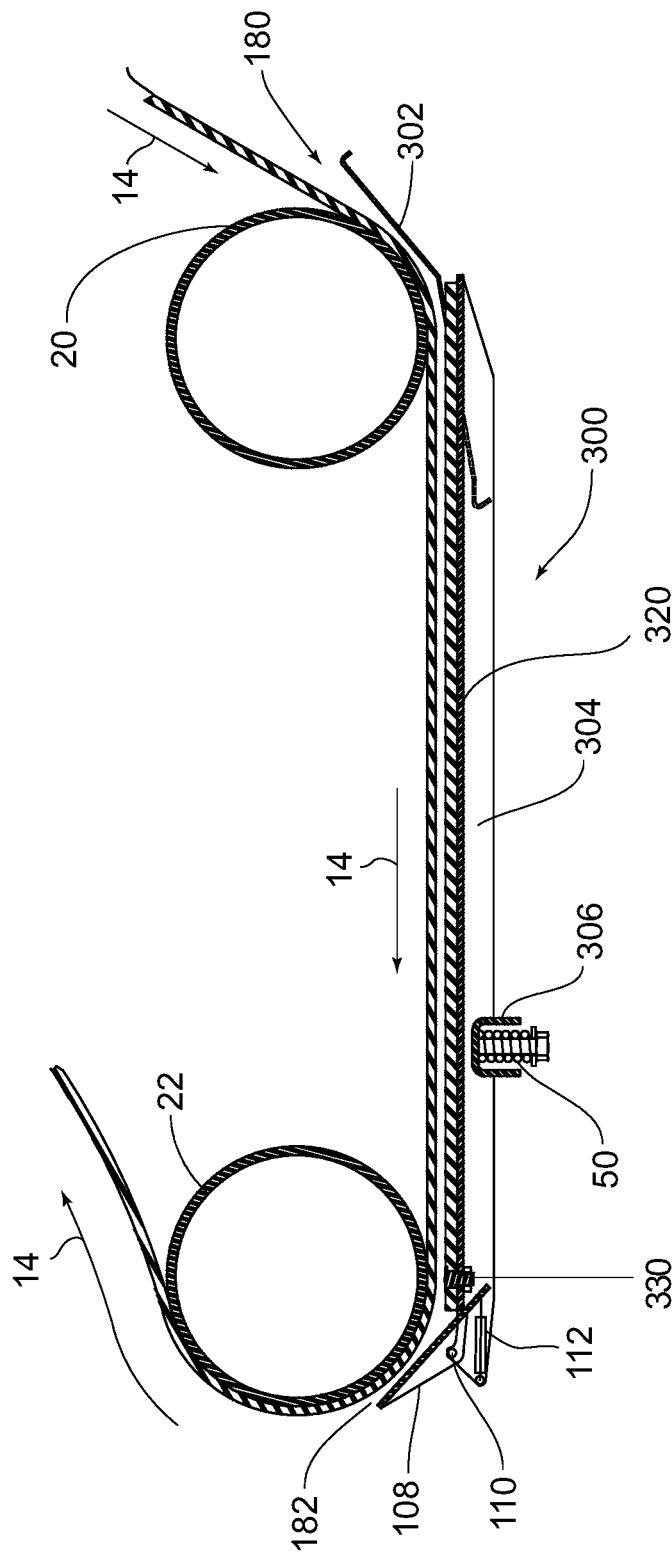
FIG. 6 is an expanded side cross-sectional view of the wrap material feed system shown in FIG. 5, illustrating a feed pan.

FIG. 6 is an expanded side cross-sectional view of the wrap material feed system 5 shown in FIG. 5. Once a leading edge of the wrap material is fed through the feed funnel 180, it is positioned between the belt 10 and the runner 304. The belt 10 pulls the wrap material in the wrap direction 14 towards a discharge location 182 adjacent the second roller 22. The discharge location 182 is defined by a discharge plate 109 attached to a plurality of discharge fingers 108 (shown in FIGS. 20-25) configured to maintain contact between the wrap material and the belt 10. The plurality of discharge fingers 108, and thereby the discharge plate 109 (shown in FIGS. 20-25), are pivotally mounted to the runner 304 at a pivot point 110, and are biased towards the second roller 22 by a spring 112. After exiting the discharge location 182, the wrap material enters the bale formation chamber 40, where it is trapped between the belt 10 and the crop material (not shown). Rotation of the bale by the belt 10 will pull the wrap material around the circumference of the bale, maintaining a suitable tension to wrap the bale with the wrap material.

Figure 7:
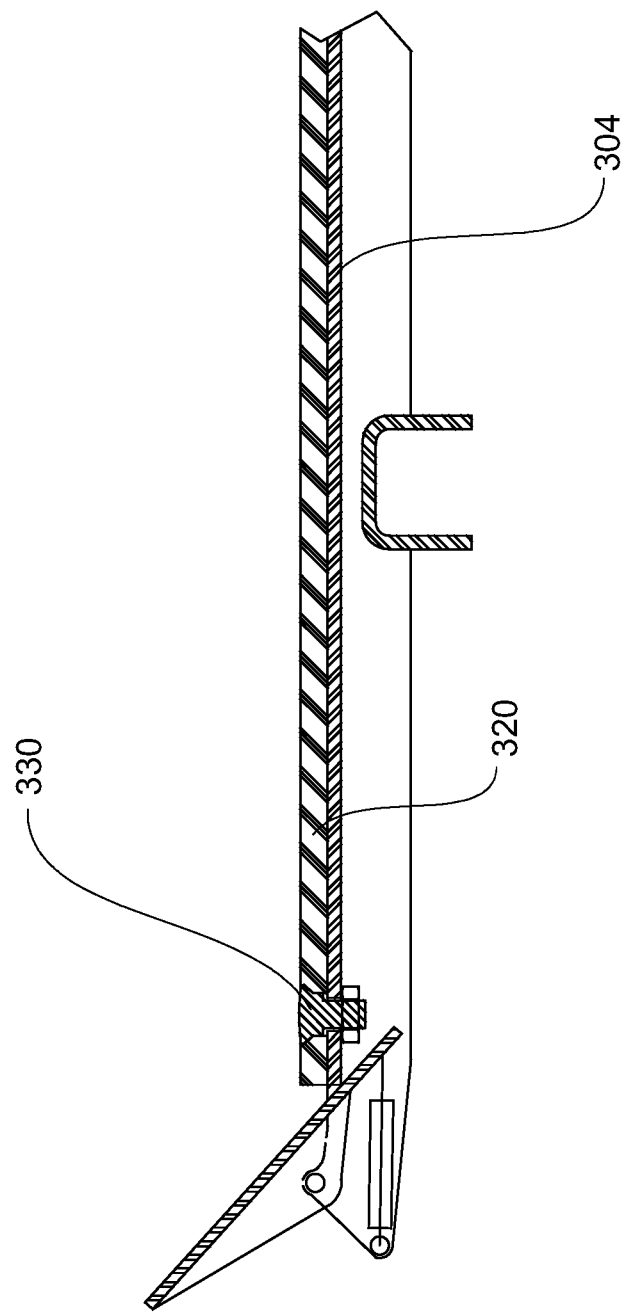
FIG. 7 is an expanded side cross-sectional view of the wrap material feed system shown in FIG. 6, illustrating an end of a runner of the feed pan.

FIG. 7 is an expanded side cross-sectional view of one end of the wrap material feed system 5 shown in FIG. 6. The feed pan 300 includes a skid plate 320 engaged with each runner 304. The skid plate 320 may be engaged with the center section 307 (shown in FIG. 5) of each runner 304. The skid plate 320 extends along a length of the runner 304 between the first end 303 and the second end 305 and defines an aperture proximate the second end 305. A fastener 330 extends through the aperture to fasten the skid plate 320 to the runner 304. In the illustrated embodiment, the fastener 330 is a plow bolt, but the fastener 330 may be any other suitable fastener that allows the feed pan 300 to function as described herein. In the example embodiment, the fastener 330 includes a flat head to minimize edges that may impact the motion of the wrap material through the wrap material feed system 5. Additionally, in the example embodiment, the fastener 330 is manufactured out of a metal material, such as, but not limited to, steel. In other embodiments, the fastener 330 may be manufactured out of a different material, such as, but not limited to, plastic.

Figure 8:
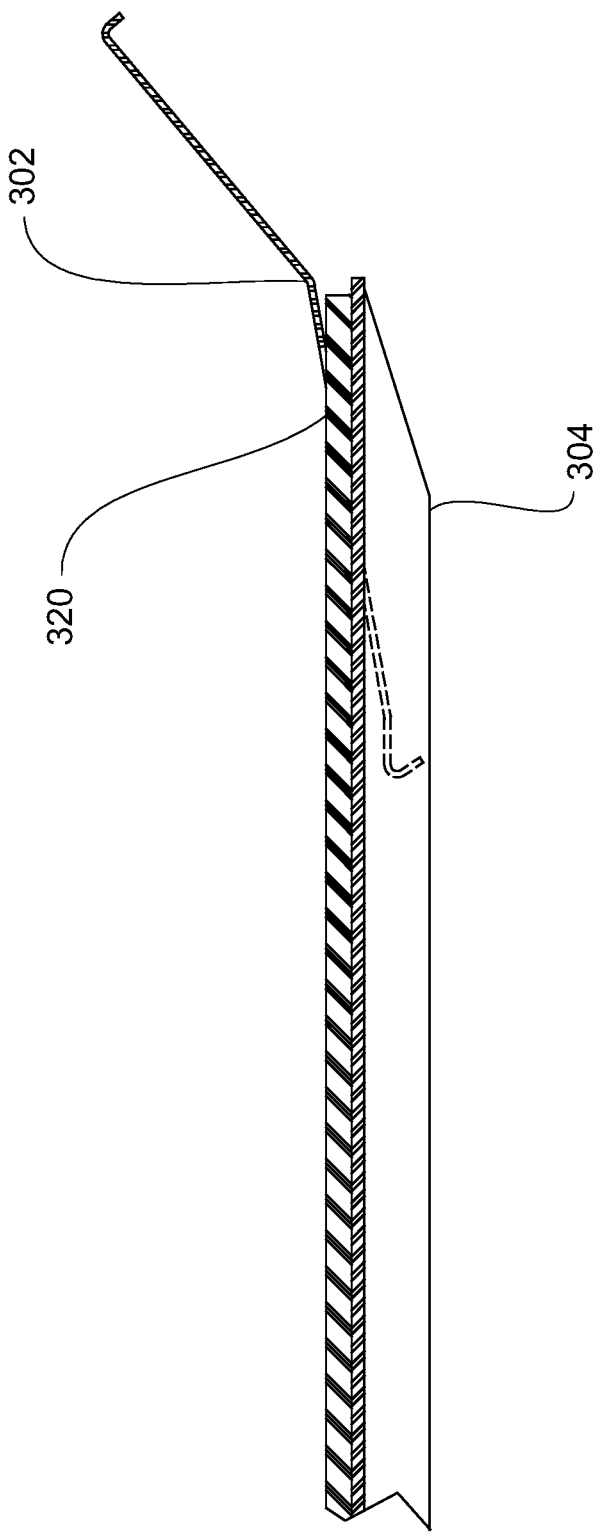
FIG. 8 is an expanded side cross-sectional view of the wrap material feed system shown in FIG. 6, illustrating another end of the runner of the feed pan.

FIG. 8 is an expanded side cross-sectional view of the other end of the wrap material feed system 5 shown in FIG. 6.

Figure 9:
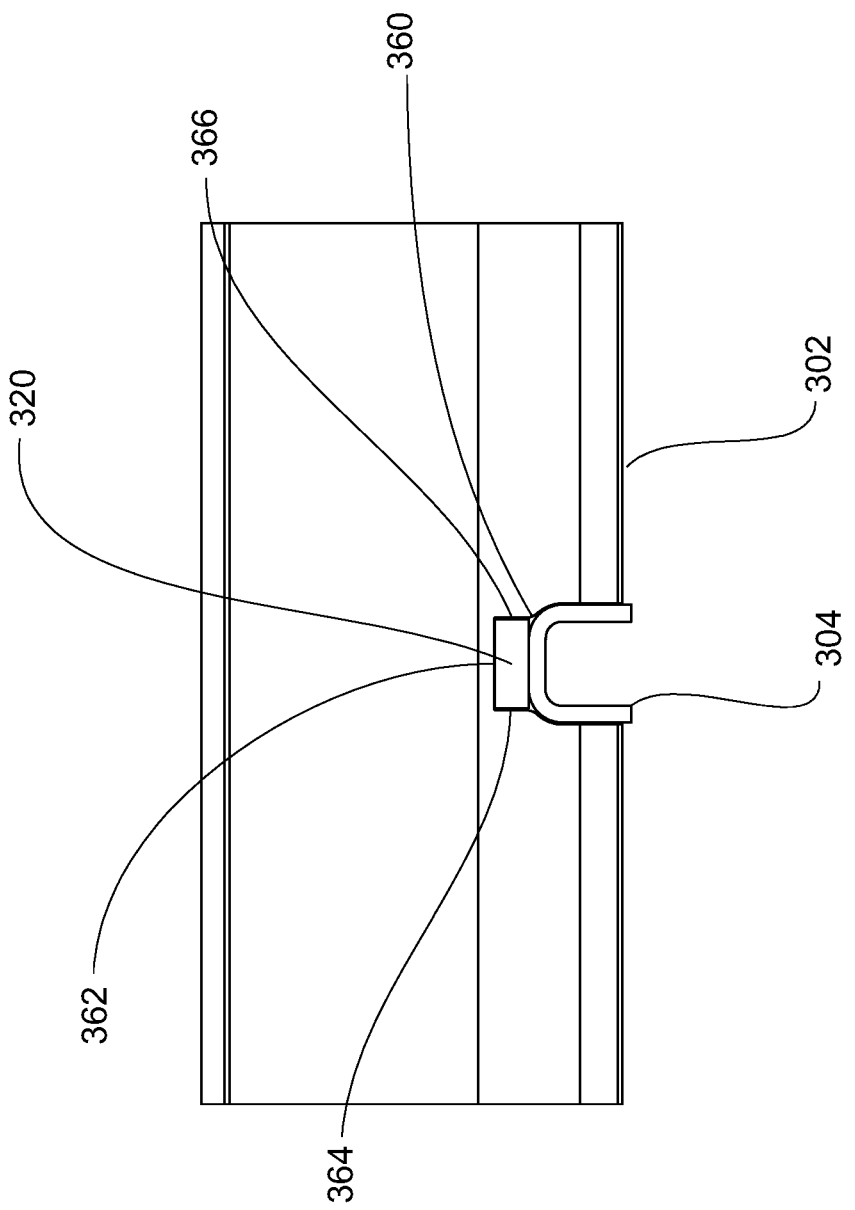
FIG. 9 is a rear cross-sectional view of the wrap material feed system shown in FIG. 5, illustrating the feed pan and a guide plate.

FIG. 9 is a rear cross-sectional view of the wrap material feed system 5. The skid plate 320 is restrained in a slot 360 formed in the guide plate 302 at the first end 303 of the runner. The slot 360 includes an upper surface 362 and side surfaces 364, 366. The upper surface 362 of the slot 360 limits vertical motion of the runner 304 and the skid plate 320, the side surfaces 364, 366 limit side-to-side motion of the runner 304 and the skid plate 320, and the fastener 330 prevents movement of the skid plate 320 relative to the runner 304. In some configurations, the skid plate 320 may not be constrained in the longitudinal direction at the first end 303, thereby making the skit plate 320 free to grow lengthwise from thermal expansion without affecting operation of the wrap material feed system 5. In further embodiments, a supplemental fastener (not shown) may be included to fasten the skid plate 320 to the runner 304 at the first end 303.

The skid plate 320 may be constructed from any material having a characteristic that reduces the tendency for crop juices and material to adhere to and accumulate on an upper surface of the skid plate 320. For example, the skid plate 320 may be constructed from a material with a lower surface energy than steel, such as a plastic or polymer, since the material property of surface energy may correlate with the tendency for crop materials and juices to accumulate. For example, the skid plate 320 may be constructed from High Density Polyethylene (HDPE) or Ultra High Molecular Weight Polyethylene (UHMW). In certain embodiments, reprocessed UHMW is used, since the process to recycle it creates stronger molecular adhesion than natural first-round virgin UHMW. In other embodiments, the runner 304 may be coated with an elastomeric or spray-on graphite lubricant coating.

Although such materials reduce the build-up of crop residue and juices, they have lower wear resistance than traditional feed pan materials (e.g., steel). Since the feed pan 300 is subject to a variety of forces, which will be discussed in greater detail herein, the skid plate 320 and related components are mounted in a configuration that minimizes wear under such forces.

Figure 10:
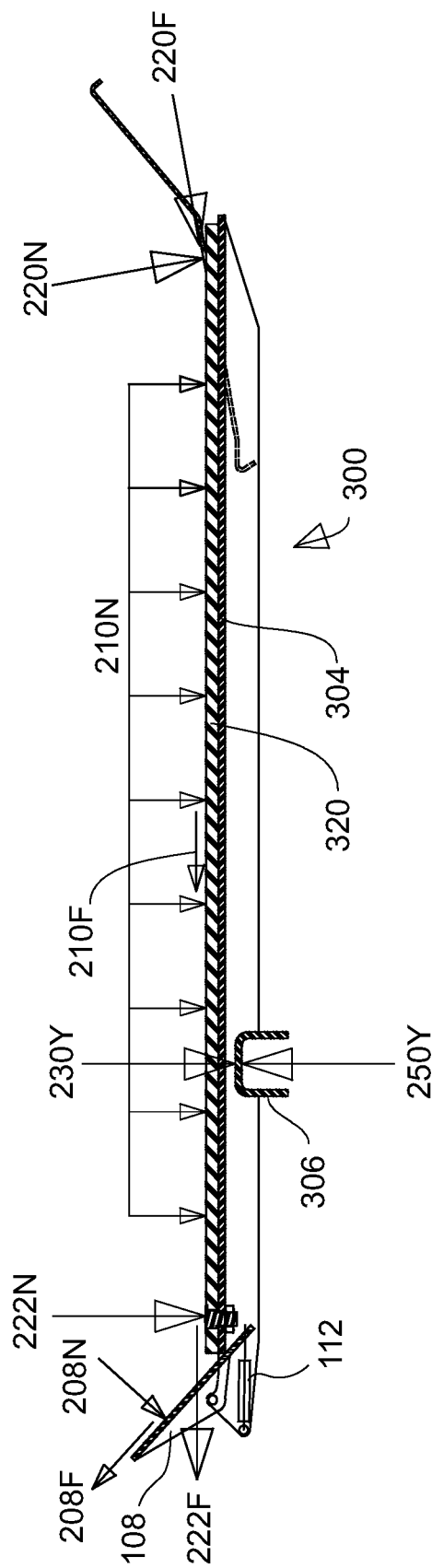
FIG. 10 is the expanded side cross-sectional view of the wrap material feed system shown in FIG. 6, additionally illustrating forces applied to a skid plate of the feed pan.

FIG. 10 is a free-body diagram illustrating forces applied to the feed pan 300. All illustrated forces are shown as being applied at discrete points or along a single line for ease of illustration. However, all illustrated forces are distributed within a concentrated area, and not applied at a single point. The belt 10 applies a first normal force 210N that is distributed across a length of the skid plate 320. The first roller 20 applies a second normal force 220N perpendicular to the guide plate 302 and at a location tangential to a curved section of the belt 10 as it conforms to the first roller 20. Since the second normal force 220N is applied to the feed pan 300 via the moving belt 10, a resulting frictional force 220F is also applied at the same location. Similarly, the second roller 22 applies a third normal force 222N and a resultant frictional force 222F adjacent to the second roller 22.

The first normal force 210N may be lower than the second normal force 220N and/or the third normal force 222N because it is limited by the flexibility of the belt 10. The first normal force 210N is shown as being evenly distributed across the skid plate 320 for simplicity of illustration; however, the first normal force 210N may be unevenly distributed. A resulting frictional force 210F is also applied to the skid plate 320 by movement of the belt 10.

The spring force of one or more of the plurality of discharge fingers 108 creates a normal force 208N and a resulting frictional force 208F between the discharge pan 109 (shown in FIGS. 20-25) and the second roller 22. The pair of springs 50 also push the feed pan 300 up and against the baler frame 30 with a force 250Y, with the pair of springs 50 creating the frictional force 208F. When the sum of all the other forces in the Y-direction are less than 250Y, the baler frame 30 may apply a force 230Y. If crop material or another foreign object is pulled between the first and second rollers 20, 22 and the feed pan 300, the second normal force 220N and/or the third normal force 222N at the respective first and second rollers 20, 22 may increase as the feed pan 300 is displaced downward, compressing one or more of the pair of springs 50 and moving the feed pan 300 away from the baler frame 30. The normal force 210N of the belt 10 may also be subject to minimal changes during operation.

Figure 11:
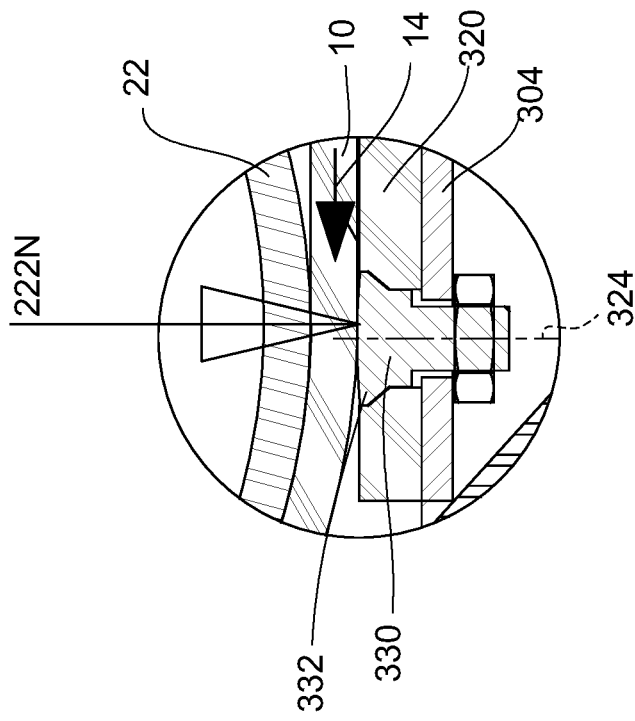
FIG. 11 is a side cross-sectional view of a first example configuration of a fastener used with the wrap material feed system shown in FIG. 4.
Figure 12:
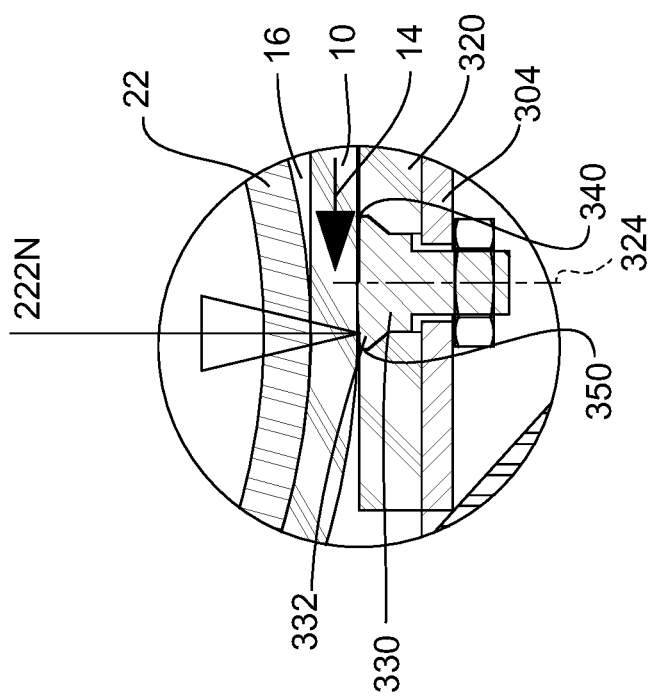
FIG. 12 is a side cross-sectional view of a second example configuration of the fastener used with the wrap material feed system shown in FIG. 4.

FIGS. 11 and 12 respectively illustrate first and second example configurations of the fastener 330 relative to the third normal force 222N of the second roller 22 on the skid plate 320. In both configurations, the vector of the third normal force 222N may be perpendicular to the surface of the skid plate 320. In the first example configuration shown in FIG. 11, a centerline 324 of the fastener 330 is upstream of the vector of the third normal force 222N. That is, the wrap material traveling with the belt 10 in the wrap direction 14 will pass the centerline 324 of the fastener before passing the vector of the third normal force 222N. In this configuration, the third normal force 222N will be carried by a head 332 of the fastener 330 at a trailing edge 350 of the head 332 of the fastener 330, causing increased wear at the trailing edge 350 compared to a leading edge 340 of the fastener 330. This configuration allows the feed pan 300 to better tolerate changing forces, which may occur, for example, when crop material or other foreign debris becomes trapped at a nip point 16 where the belt 10 and second roller 22 converge.

In the second example configuration shown in FIG. 12, the centerline 324 of the fastener 330 is positioned proximate or slightly downstream of the third normal force 222N such that the vector of the third normal force 222N intersects the head 332 of the fastener 330. As mentioned, this configuration provides a similar benefit as the configuration shown in FIG. 11 of minimizing wear to the skid plate 320 by allowing the fastener 330 to support the majority of the third normal force 222N, minimizing the likelihood of wear on the skid plate 320. The technical effect of the configurations shown in FIGS. 11 and 12 is the head 332 of the fastener 330 may wear before the skid plate 320.

Figure 13:
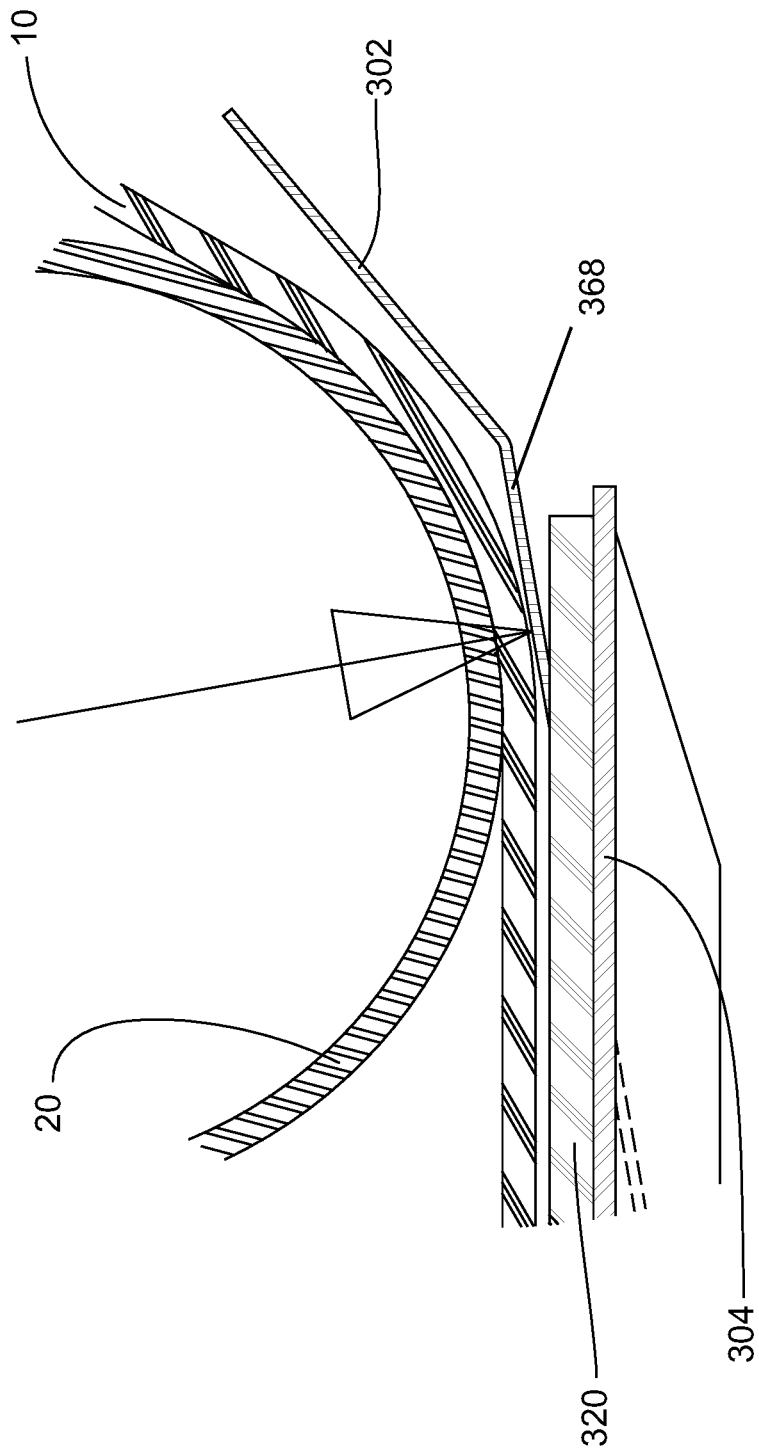
FIG. 13 is an expanded side cross-sectional view of the wrap material feed system shown in FIG. 4, illustrating a configuration of the guide plate and the runner.

FIG. 13 is an expanded view of a portion of the cross-sectional view shown in FIG. 5, more clearly illustrating a configuration of the guide plate 302 and the runner 304. The guide plate 302 includes a planar section 368 that provides a reaction surface to contact the belt 10. The planar section 368 defines a slot through which the skid plate 320 is disposed. The second normal force 220N of the first roller 20 on the guide plate 302 is applied through a centerline of the first roller 20. This configuration allows the guide plate 302 to carry the majority of the second normal force 220N of the first roller 20, minimizing the force applied by the belt 10 to the skid plate 320 and therefore minimizing the wear rate of the skid plate 320.

Figure 15:
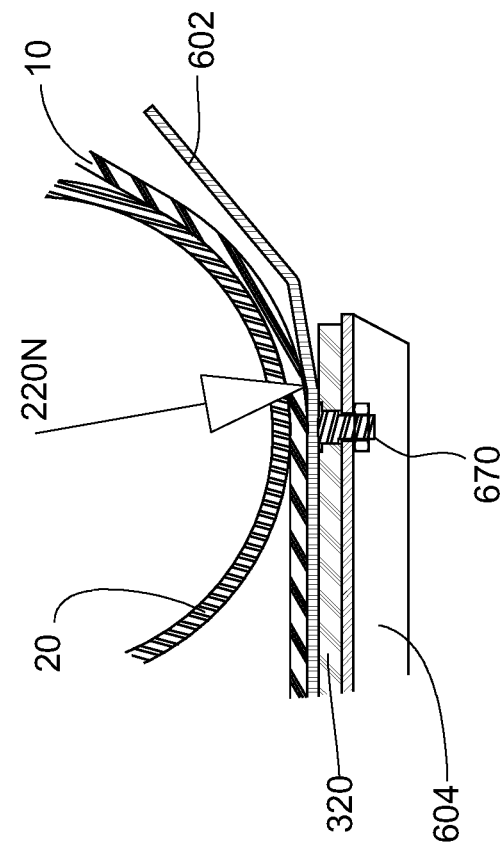
FIG. 15 is an expanded side cross-sectional view of the wrap material feed system shown in FIG. 4, illustrating a further configuration of the guide plate and the runner.
Figure 14:
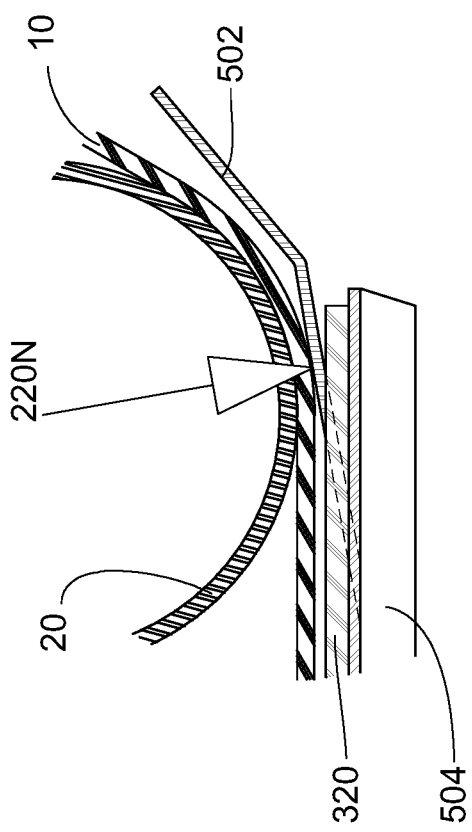
FIG. 14 is an expanded side cross-sectional view of the wrap material feed system shown in FIG. 4, illustrating an additional configuration of the guide plate and the runner.

FIGS. 14 and 15 are expanded views of a portion of the cross-sectional view shown in FIG. 5, more clearly illustrating further configurations of the guide plate 302 and the runner 304. In the example embodiment shown in FIG. 14, each of a plurality of guide plates 502 are approximately the same width as each of the plurality of runners 504, with each of the plurality of runners 504 being integrally formed with the respective guide plate of the plurality of guide plates 502 from the same plate.

Figure 20:
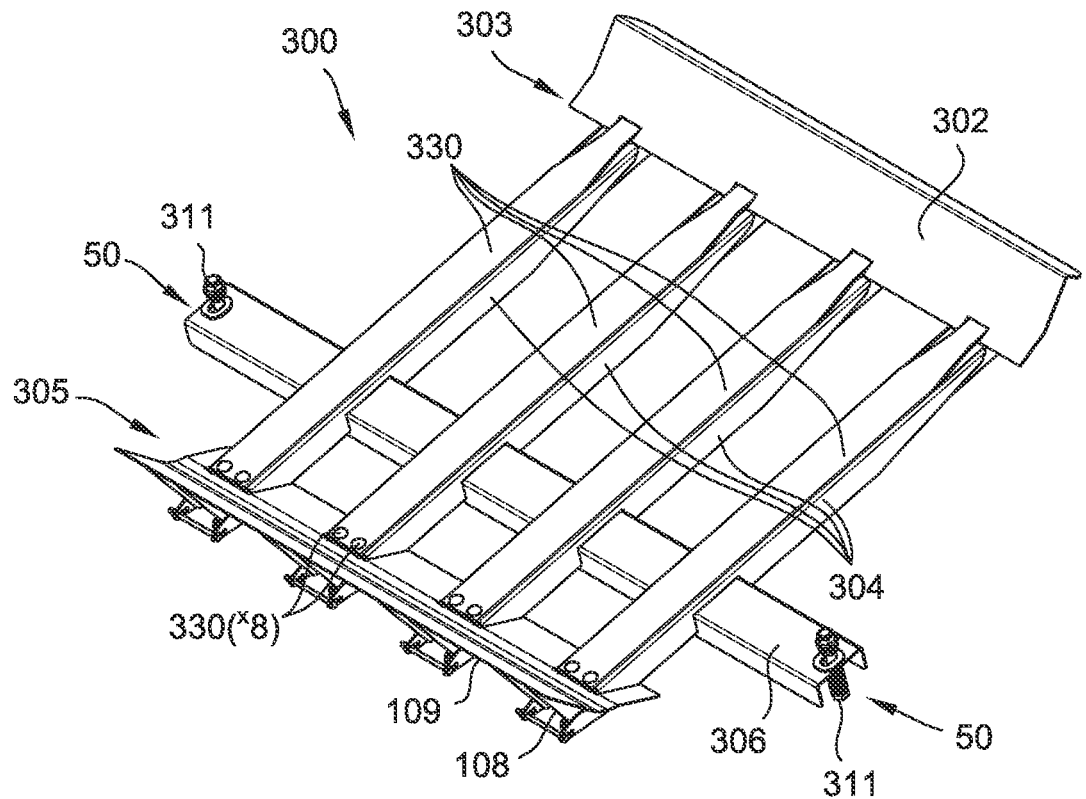
FIG. 20 is a top perspective view of the wrap material feed system shown in FIG. 4, illustrating the guide plate.
Figure 21:
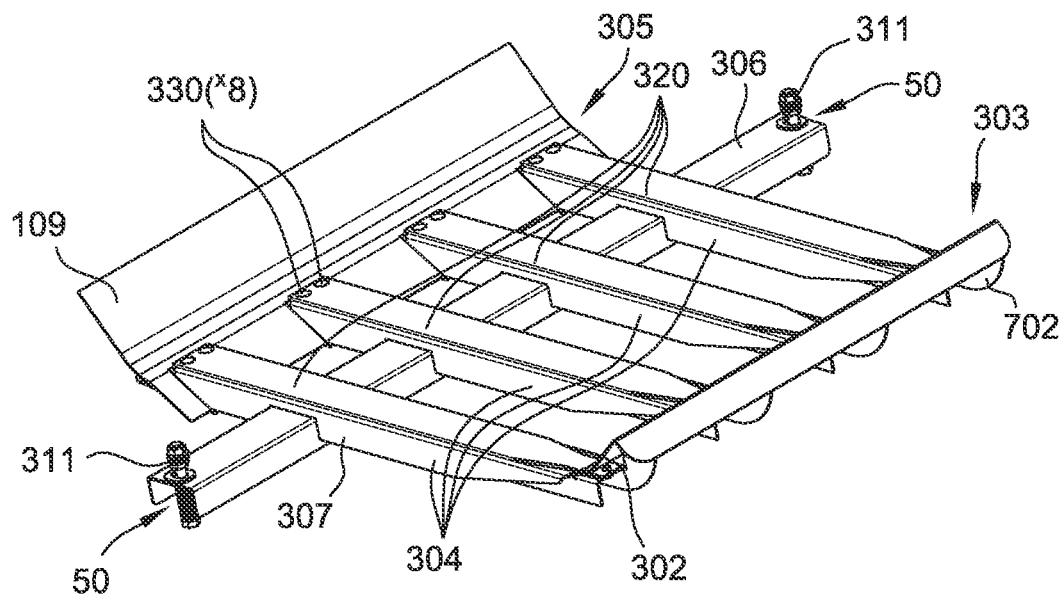
FIG. 21 is another top perspective view of the wrap material feed system shown in FIG. 20.

In the example embodiment shown in FIG. 15, each of a plurality of guide plates 602 are approximately the same width as each of the plurality of runners 604, with each of the plurality of runners 504 being coupled to one of the plurality of guide plates 502 and not being integrally formed with the plurality of guide plates 502. This differs from previously shown embodiments, in which the guide plate 302 continuously spanned one or more of the runner 304 (such as shown in FIGS. 20 and 21). In the example embodiment shown in FIG. 15, a supplemental fastener 670 fastens the skid plate 320 to the runner 604. The supplemental fastener 670 may be a plow bolt or any other suitable fastener.

Figure 16:
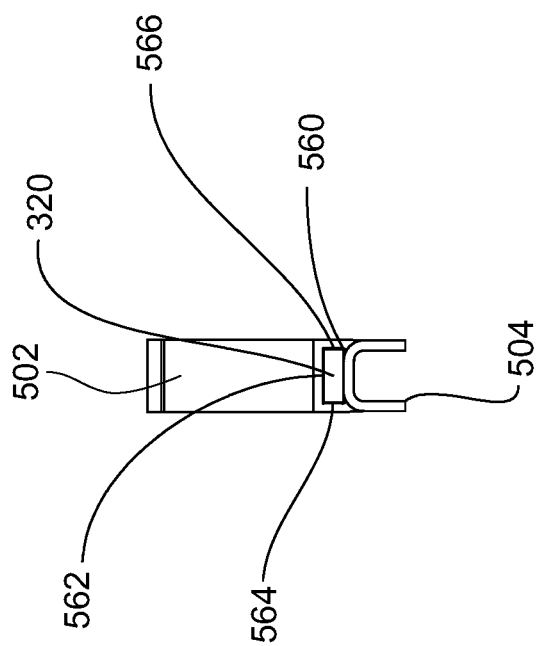
FIG. 16 is a rear cross-sectional view of the configuration of the feed pan and the guide plate shown in FIG. 14.

FIG. 16 is a rear cross-sectional views of FIG. 14. Each of the plurality of guide plates 502 define a slot 560 with an upper surface 562 and side surfaces 564 and 566. The slot 360 is sized to receive the skid plate 320 therethrough.

Figure 17:
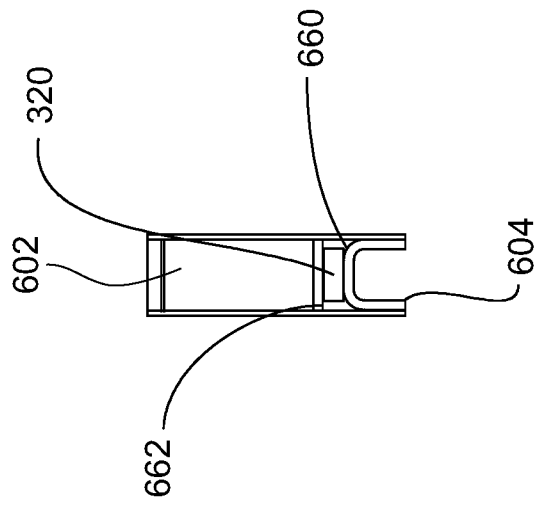
FIG. 17 is a rear cross-sectional view of the configuration of the feed pan and the guide plate shown in FIG. 15.

FIG. 17 is a rear cross-sectional views of FIG. 15. The guide plate 602 includes a surface 662 positioned adjacent an upper surface of the skid plate 320.

Figure 18:
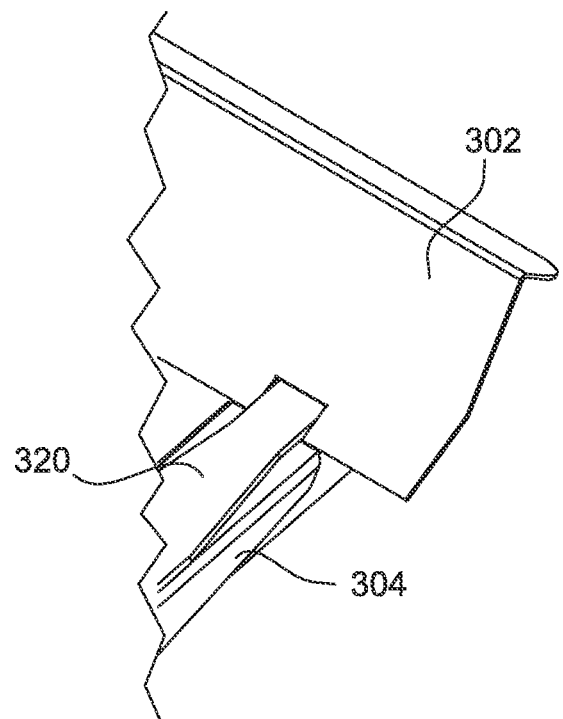
FIG. 18 is a top perspective view of the wrap material feed system shown in FIG. 4, illustrating the guide plate and the runner.

FIG. 18 is a top perspective view of a connection between the guide plate 302 and the runner 304, in a configuration in which the guide plate 302 spans one or more of the runner 304.

Figure 19:
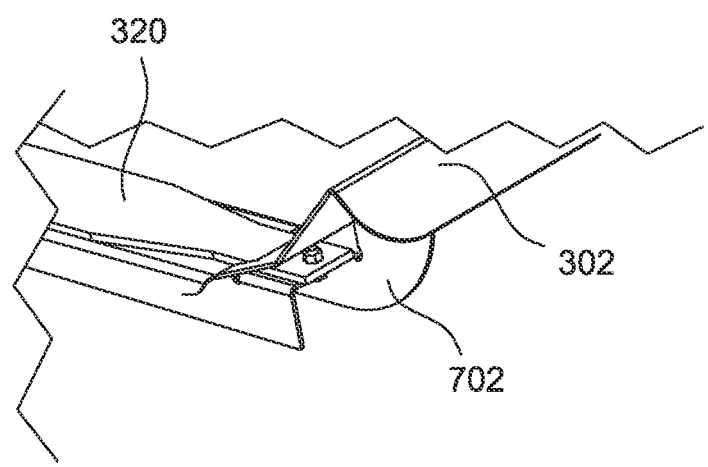
FIG. 19 is a side perspective view of the wrap material feed system shown in FIG. 4, illustrating the guide plate and the runner.

FIG. 19 is a side perspective of the connection between the guide plate 302 and the runner 304, in the configuration in which the guide plate 302 spans one or more of the runner 304. In this example configuration, the wrap material feed system 5 includes a gusset 702 connected to each runner 304.

FIGS. 20 and 21 are top perspective views of the wrap material feed system 5 with the guide plate 302 spanning one or more of the runner 304.

Figure 22:
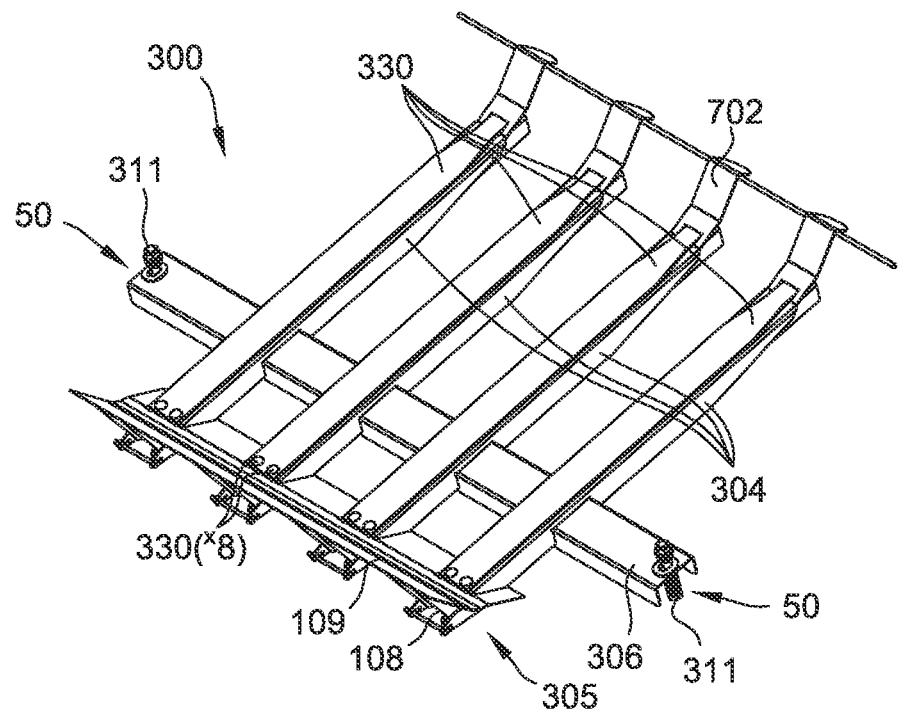
FIG. 22 is a top perspective view of an alternative embodiment of the wrap material feed system, illustrating a plurality of guide plates.
Figure 23:
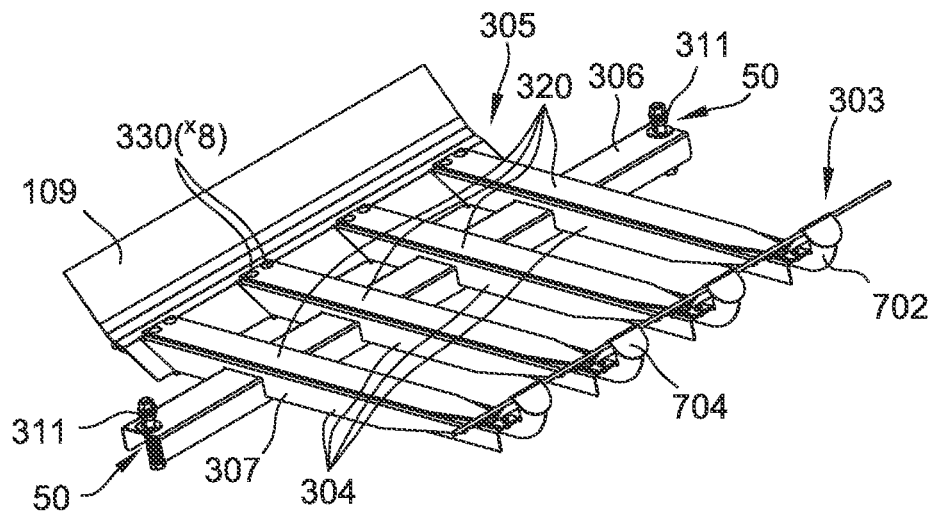
FIG. 23 is another top perspective view of the alternative embodiment of the wrap material feed system shown in FIG. 22.

FIGS. 22 and 23 are top perspective views of the wrap material feed system 5 with one of a plurality of guide plates 704 for each of the one or more of the runner 304. The plurality of guide plates 704 may be supported by a rod member.

Figure 24:
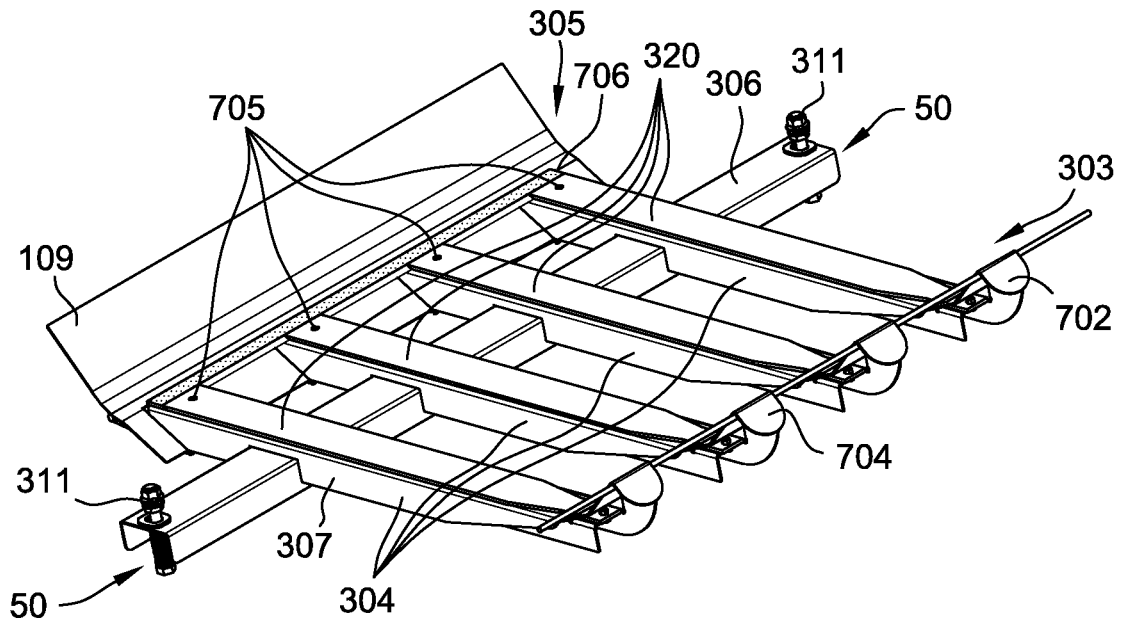
FIG. 24 is a top perspective view of an alternative embodiment of the wrap material feed system, illustrating a wear plate.

FIG. 24 is a top perspective view of an alternative embodiment of the wrap material feed system 5, in which a wear plate 706 spans the one or more of the runner 304. The wear plate may be positioned to replace the head 332 of the fastener 330 as the wear surface, as discussed previously herein for other embodiments. The embodiment shown in FIG. 24 may facilitate reduced wear to the skid plate 320.

Figure 25:
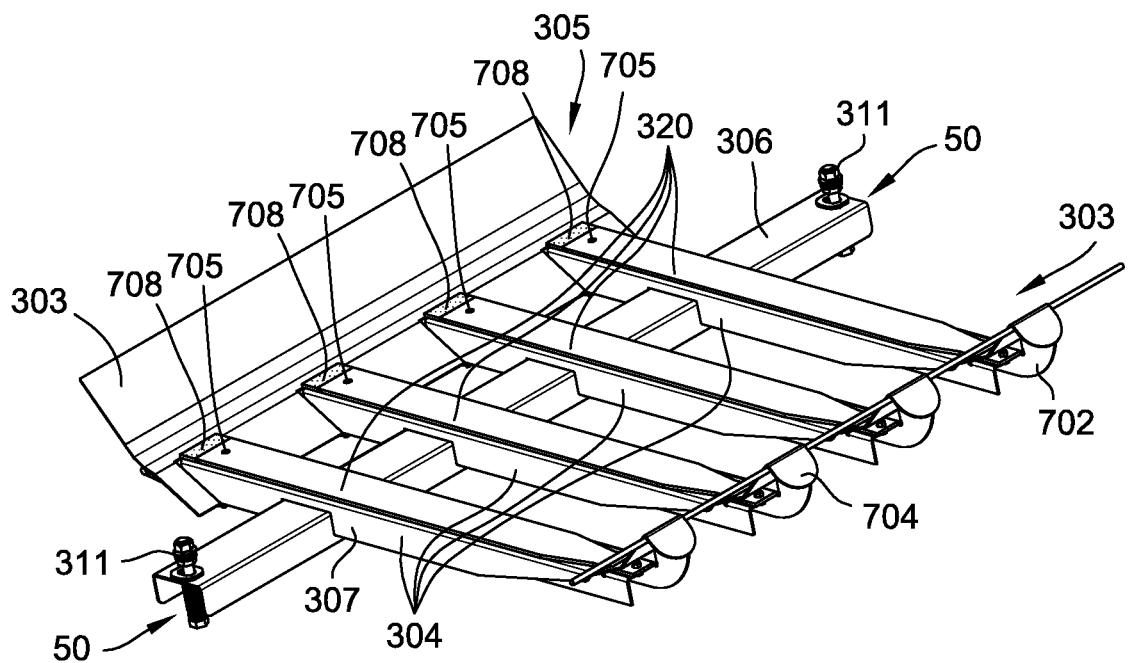
FIG. 25 is a top perspective view of yet another alternative embodiment of the wrap material feed system, illustrating a plurality of wear plates.

FIG. 25 is a top perspective view of an alternative embodiment of the wrap material feed system 5, in which each runner 304 includes one of a plurality of wear plates 708. One or more of the plurality of wear plates 708 may be positioned to replace the head 332 of the fastener 330 as the wear surface, as discussed previously herein for other embodiments. The embodiment shown in FIG. 25 may facilitate reduced wear to the skid plate 320.

Compared to conventional wrap material feed systems, the wrap feed material systems of the present disclosure have several advantages. Constructing the skid plate from a material with a low surface energy, such as a polymeric material, reduces the tendency for crop residue and juices to build up on its surface, thereby reducing any obstructions to the wrap material. Additionally, the wear rate of the skid plate may be reduced by positioning the head of a plow bolt or an edge of the guide plate at the location with the highest normal forces of the bale formation belt. Furthermore, the skid plate may be unconstrained in the longitudinal direction. Since the polymeric skid plate and steel runner will likely have different thermal expansion properties, such a configuration allows the skid plate to thermally expand without compromising operation of the wrap material feed system. Additionally, fastening the skid plate to the runner with a single bolt may simplify repair and routine maintenance of the baler.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

This written description uses examples to disclose the invention, including the best mode and to enable a person of ordinary skill in the relevant art to make and practice the invention, including making and using any devices or systems and performing any incorporated methods. The patentable scope of the invention is defined by the claims. Such other examples are within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

What is claimed is:

1. A wrap material feed system of a round baler for forming crop material into a cylindrical bale, the wrap material feed system comprising:
    a first roller;
    a second roller;
    a bale formation belt routed around and extending between each of the first roller and the second roller;
    a feed pan oriented from a first end adjacent the first roller to a second end adjacent the second roller; and
    a feed pan positioning mechanism oriented to bias the feed pan into engagement with each of the first and second rollers and the bale formation belt,
    wherein the feed pan comprises:
        one or more runners extending from the first end adjacent the first roller to the second end adjacent the second roller, each of the one or more runners comprising a center section adjacent the bale formation belt that extends between each of the first and second rollers;
        at least one guide plate positioned at the first end of each of the one or more runners;
        one or more skid plates, each of the one or more skid plates oriented to engage with the center section of one of the one or more runners; and
        one or more fasteners comprising a fastener head, each of the one or more fasteners positioned at the second end of each of the one or more runners and oriented to secure each of the one or more runners to one of the one or more skid plates, wherein the fastener head is positioned at the second end such that a vector representing a first normal force at the second roller intersects the fastener head.

2. The wrap material feed system of claim 1, wherein the one or more skid plates comprise a material having a low surface energy.

3. The wrap material feed system of claim 2, wherein the one or more skid plates comprise a polymeric material.

4. The wrap material feed system of claim 1, wherein the at least one guide plate comprises one or more slots, each of the one or more runners and the one or more skid plates are disposed in one of the one or more slots formed in the at least one guide plate.

5. The wrap material feed system of claim 4, wherein the each of the one or more slots formed in the guide plate comprise an upper slot surface that limits motion of the one or more runners disposed in the one or more slots, the upper slot surface being positioned such that a vector representing a second normal force at the first roller intersects the guide plate adjacent the upper slot surface.

6. The wrap material feed system of claim 1, wherein the feed pan further comprises a supplemental fastener positioned at the first end of each of the one or more runners and oriented to secure each of the one or more runners to one of the one or more skid plates.

7. The wrap material feed system of claim 1, wherein the one or more skid plates comprise a material having a low adherence to reduce a tendency for crop materials to adhere to the one or more skid plates.

8. The wrap material feed system of claim 1, wherein the at least one guide plate comprises a single guide plate positioned at the first end of the one or more runners.

9. The wrap material feed system of claim 1, wherein the at least one guide plate comprises a plurality of guide plates, each of the plurality of guide plates being positioned at the first end of one of the one or more runners.

10. The wrap material feed system of claim 9, wherein one or more of the plurality of guide plates is integrally formed with one of the one or more runners.

11. The wrap material feed system of claim 1, wherein the feed pan positioning mechanism comprises a pair of springs to bias the feed pan into engagement with each of the first and second rollers and the bale formation belt.

12. The wrap material feed system of claim 11, wherein the pair of springs deflect to move the feed pan away from the first roller to minimize damage made by material being passed through the wrap material feed system between the bale formation belt and the feed pan.

13. The wrap material feed system of claim 1, wherein the feed pan further comprises a cross-member secured to each of the one or more runners.

14. The wrap material feed system of claim 13, wherein the round baler comprises a baler frame, the cross-member being secured to the baler frame.

15. The wrap material feed system of claim 1, wherein the feed pan further comprises a discharge plate coupled to a plurality of discharge fingers, the plurality of discharge fingers being oriented to maintain contact between the bale formation belt and wrap material fed through the wrap material feed system.

16. The wrap material feed system of claim 15, wherein the discharge plate is pivotally mounted to the one or more runners.

17. A wrap material feed system of a round baler for forming crop material into a cylindrical bale, the wrap material feed system comprising:
    a first roller;
    a second roller;

a bale formation belt routed around and extending between each of the first roller and the second roller;

a feed pan oriented from a first end adjacent the first roller to a second end adjacent the second roller; and a feed pan positioning mechanism oriented to bias the feed pan into engagement with each of the first and second rollers and the bale formation belt, wherein the feed pan comprises:

one or more runners extending from the first end adjacent the first roller to the second end adjacent the second roller, each of the one or more runners comprising a center section adjacent the bale formation belt that extends between each of the first and second rollers;

at least one guide plate positioned at the first end of each of the one or more runners;

one or more skid plates, each of the one or more skid plates oriented to engage with the center section of one of the one or more runners; and at least one wear component positioned at the second end of the one or more runners, wherein the at least one wear component is positioned at the second end such that a vector representing a first normal force at the second roller intersects the at least one wear component.

18. The wrap material feed system of claim 17, wherein the at least one wear component comprises a plurality of wear components, each of the plurality of wear components being positioned at the second end of one of the one or more runners.

19. The wrap material feed system of claim 17, wherein the feed pan further comprises one or more fasteners positioned at the second end of each of the one or more runners and oriented to secure each of the one or more runners to one of the one or more skid plates.

20. The wrap material feed system of claim 19, wherein the at least one wear component is positioned at the second end of each of the one or more runners between the at least one guide plate and the one or more fasteners.

* * * * *